US012626615B2

(12) United States Patent
Kelly

(10) Patent No.: US 12,626,615 B2
(45) Date of Patent: May 12, 2026

(54) POP-UP SCENE WITH INTEGRATED LOCK

(71) Applicant: American Greetings Corporation, Cleveland, OH (US)

(72) Inventor: Charles Robert Kelly, Amherst, OH (US)

(73) Assignee: American Greetings Corporation, Cleveland, OH (US)

( * ) Notice: Subject to any disclaimer, the term of this patent is extended or adjusted under 35 U.S.C. 154(b) by 83 days.

(21) Appl. No.: 18/678,618

(22) Filed: May 30, 2024

(65) Prior Publication Data

US 2025/0372003 A1 Dec. 4, 2025

(51) Int. Cl.

| | |
|---|---|
| ***G09F 1/06*** | (2006.01) |
| ***A63H 33/16*** | (2006.01) |
| ***A63H 33/42*** | (2006.01) |

(52) U.S. Cl.

CPC ............... *G09F 1/06* (2013.01); *A63H 33/16* (2013.01); *A63H 33/42* (2013.01)

(58) Field of Classification Search

CPC ............ G09F 1/06; A63H 33/16; A63H 33/42

See application file for complete search history.

(56) References Cited

U.S. PATENT DOCUMENTS

| | | | | |
|---|---|---|---|---|
| 2,125,424 | A * | 8/1938 | Cloud | G09F 1/06 40/539 |
| 2,408,272 | A * | 9/1946 | Roach | A63H 3/52 446/109 |
| 7,395,622 | B2 | 7/2008 | Malkovas | |
| 9,836,997 | B1 * | 12/2017 | Brandrup | G09F 1/06 |
| 10,500,887 | B1 * | 12/2019 | Kelly | B42D 15/045 |
| 12,293,678 | B2 | 5/2025 | Kelly | |
| 2019/0091595 | A1 * | 3/2019 | Pridonoff | A63H 33/008 |
| 2019/0329145 | A1 * | 10/2019 | Simmons | A63H 33/42 |
| 2022/0122487 | A1 * | 4/2022 | Bucco | G09F 1/06 |
| 2023/0035001 | A1 * | 2/2023 | Kelly | G09F 1/06 |
| 2024/0071258 | A1 * | 2/2024 | Kelly | A63H 33/16 |

FOREIGN PATENT DOCUMENTS

| | | |
|---|---|---|
| JP | 2013114255 | 6/2013 |

* cited by examiner

*Primary Examiner* — Gary C Hoge
(74) *Attorney, Agent, or Firm* — Christine Flanagan

(57) ABSTRACT

A foldable paper décor item that includes a pop-up with integrated lock structure. The item can be folded flat for mailing or storage and then unfolded to place on display. The pop-up contains an integrated lock structure that is also part of the scenic display. The foldable paper display item can be reused many times over.

9 Claims, 8 Drawing Sheets

POP-UP SCENE WITH INTEGRATED LOCK

CROSS-REFERENCE TO RELATED APPLICATIONS

There are no applications related to this application.

SUMMARY OF THE INVENTION

A foldable paper décor item with integrated lock including a base panel, a pop-up structure attached to the base panel that is moveable between a first position, wherein it is substantially flat and folded, and a second position, wherein it is unfolded and upright, and a lock mechanism attached to the base panel that is moveable between a first position, wherein it is substantially flat and folded, and a second position, wherein it is unfolded and upright. The lock mechanism also makes up part of the pop-up structure.

A foldable paper décor item including a base panel, a first pop-up structure attached to the base panel, and a second pop-up structure attached to the base panel. The first and second pop-up structures are moveable between a first, substantially flat position and a second, upright position, and the second pop-up structure is also a lock mechanism that retains the foldable paper décor item in the second position.

A foldable paper décor item including a base panel, a first pop-up structure, a second pop-up structure, and a locking mechanism. The first and second pop-up structures and the locking mechanism are moveable between a first position, wherein they are substantially flat and folded, and a second position, wherein they are upright and unfolded, and the locking mechanism interconnects with the first or second pop-up structure to form a scene and to retain the first and second pop-up structure in the second position.

DETAILED DESCRIPTION OF THE INVENTION

Figure 1:
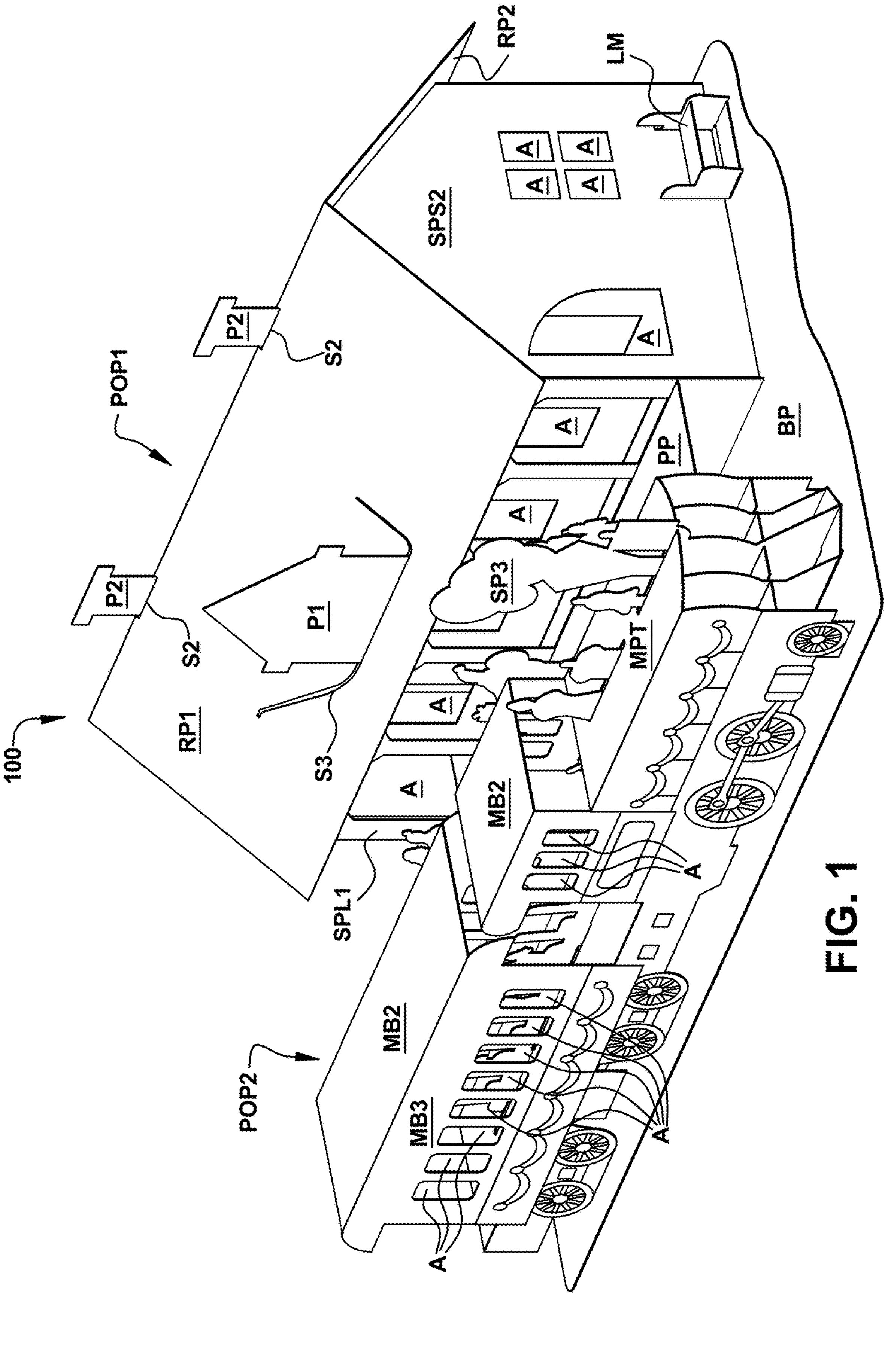
FIG. 1 is a perspective view of the pop-up scene with integrated lock, in an open, locked position.
Figure 2A:
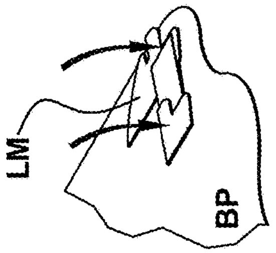
FIG. 2A is a close up view of the lock mechanism of FIG. 2.
Figure 2:
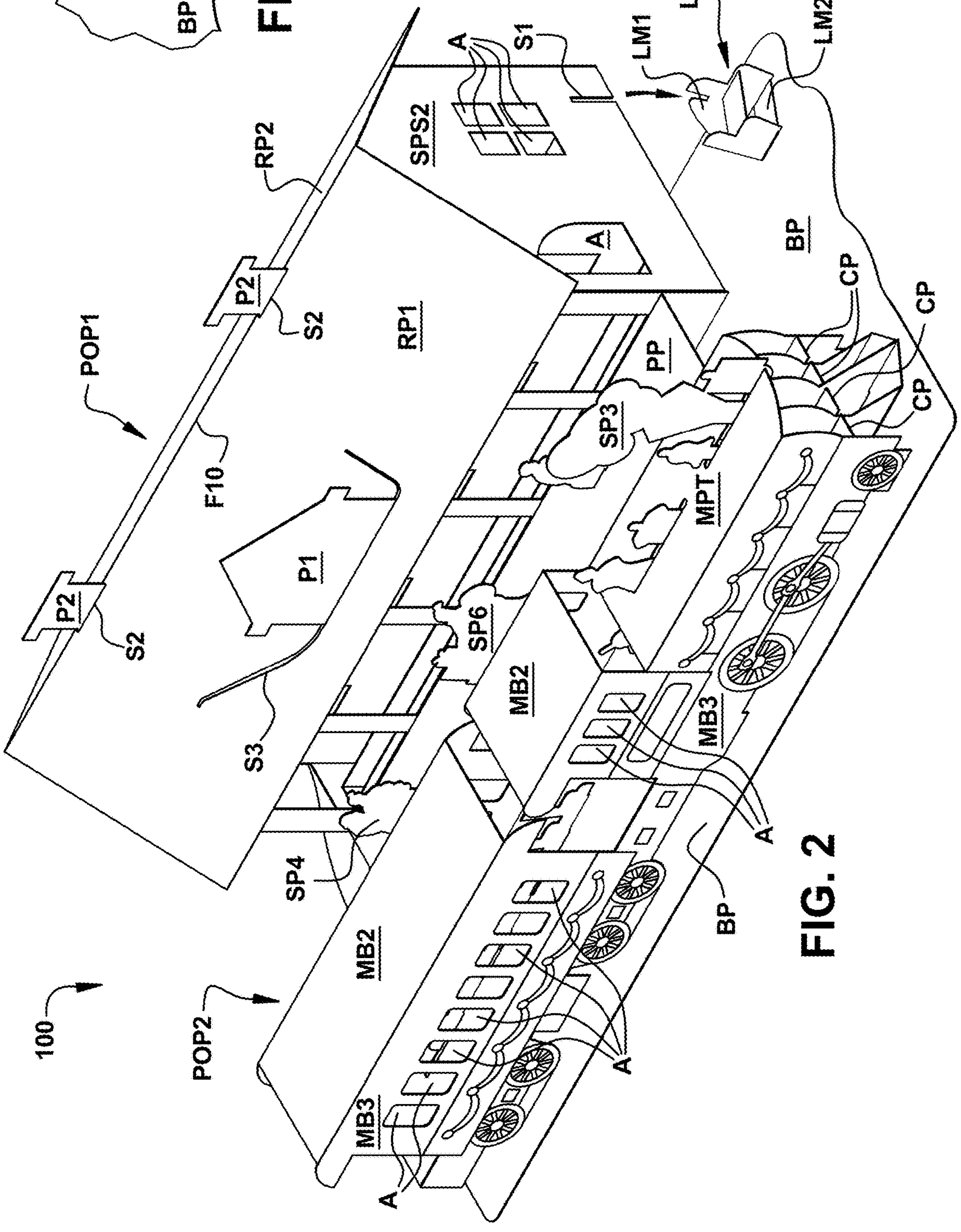
FIG. 2 is a perspective view of the pop-up scene with integrated lock of FIG. 1, in a first transitional position.
Figure 3:
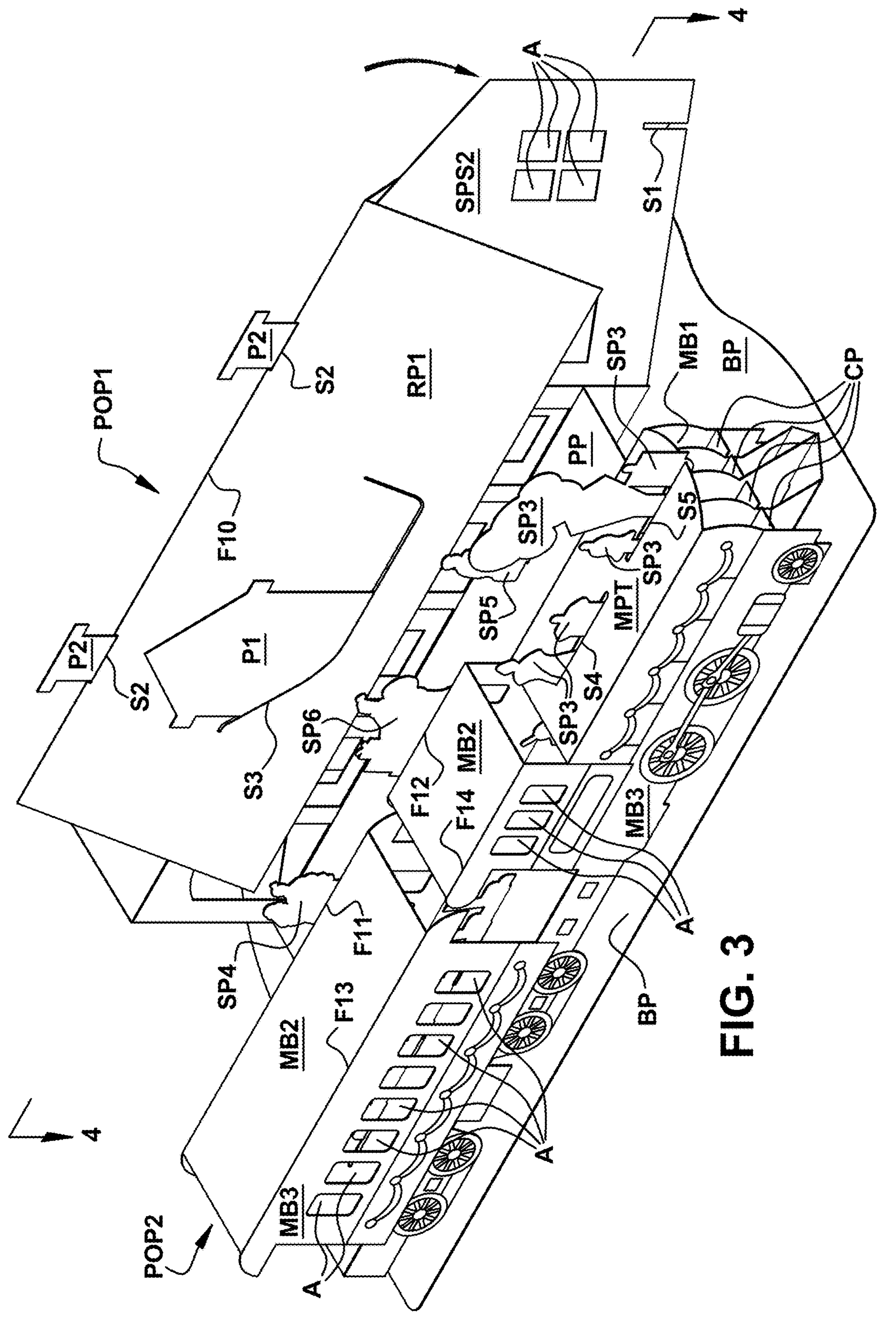
FIG. 3 is a perspective view of the pop-up scene with integrated lock of FIG. 1, in a second transitional position.
Figure 4:
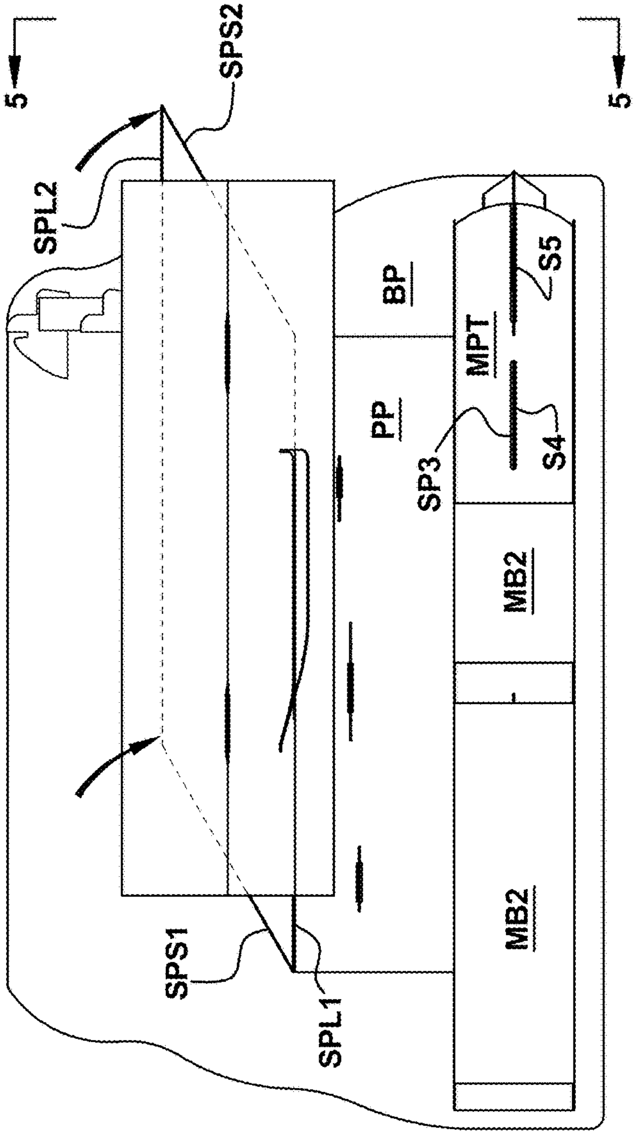
FIG. 4 is a view of the pop-up scene with integrated lock of FIG. 3, from the direction of arrows 4-4.
Figure 5:
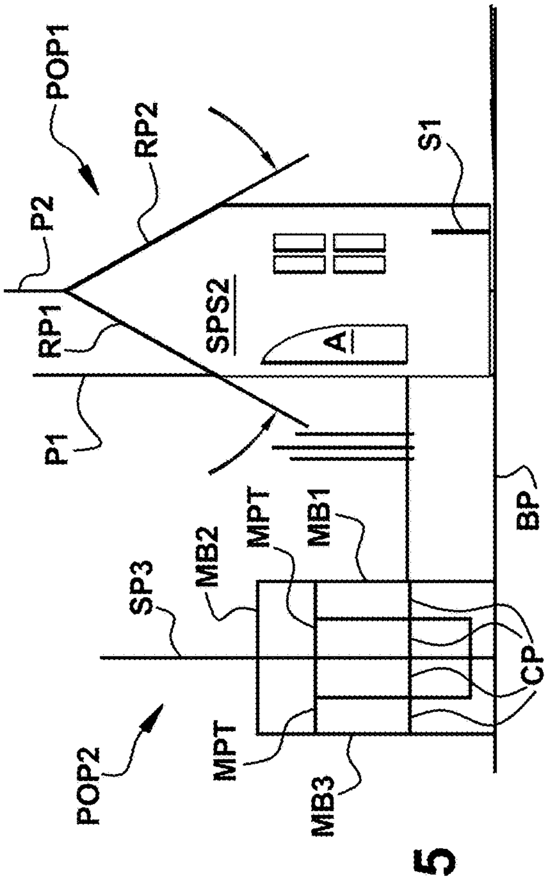
FIG. 5 is a view of the pop-up scene with integrated lock of FIG. 4, from the direction of arrows 5-5.
Figure 6:
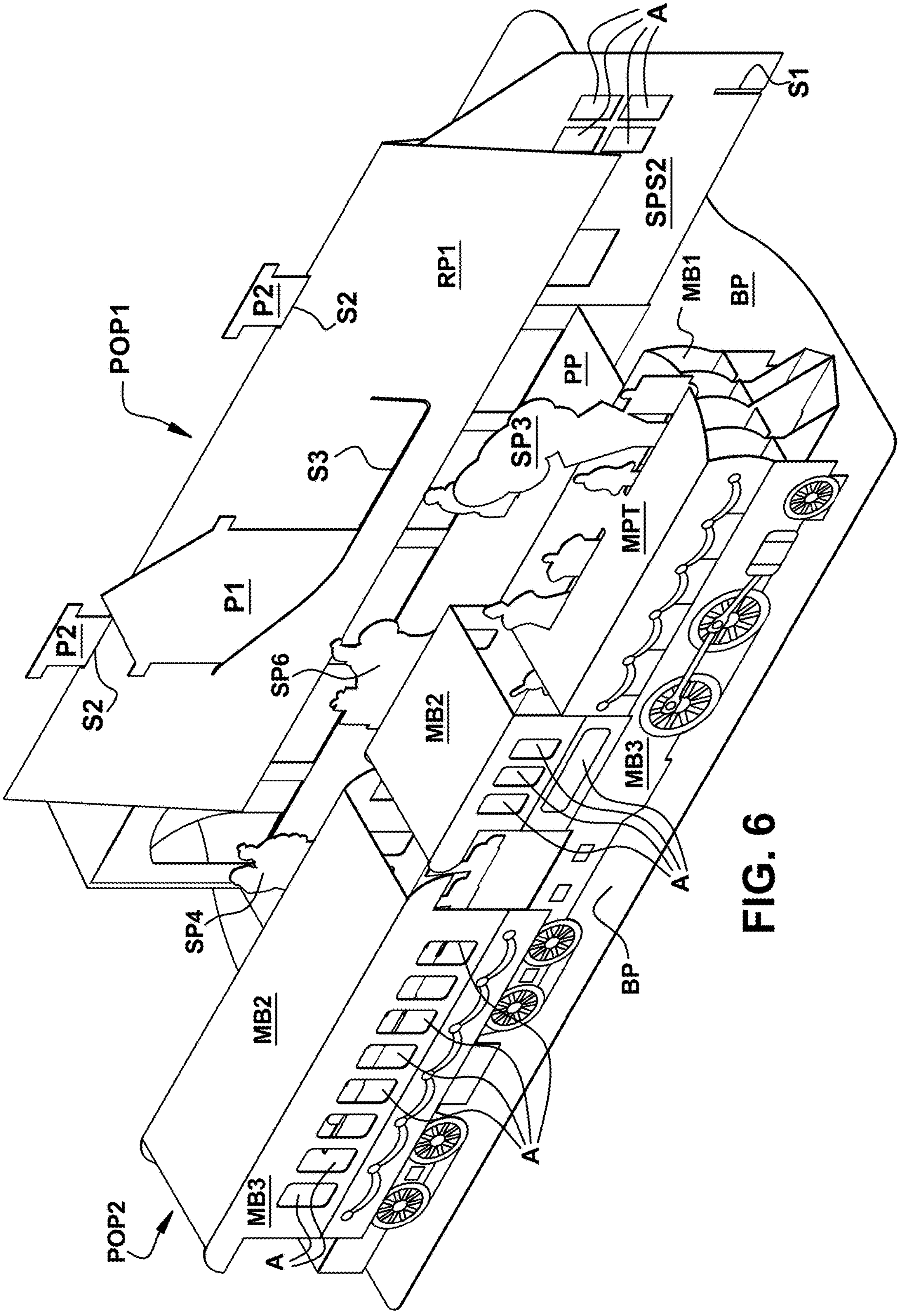
FIG. 6 is a perspective view of the pop-up scene with integrated lock of FIG. 1, in a third transitional position.
Figure 7:
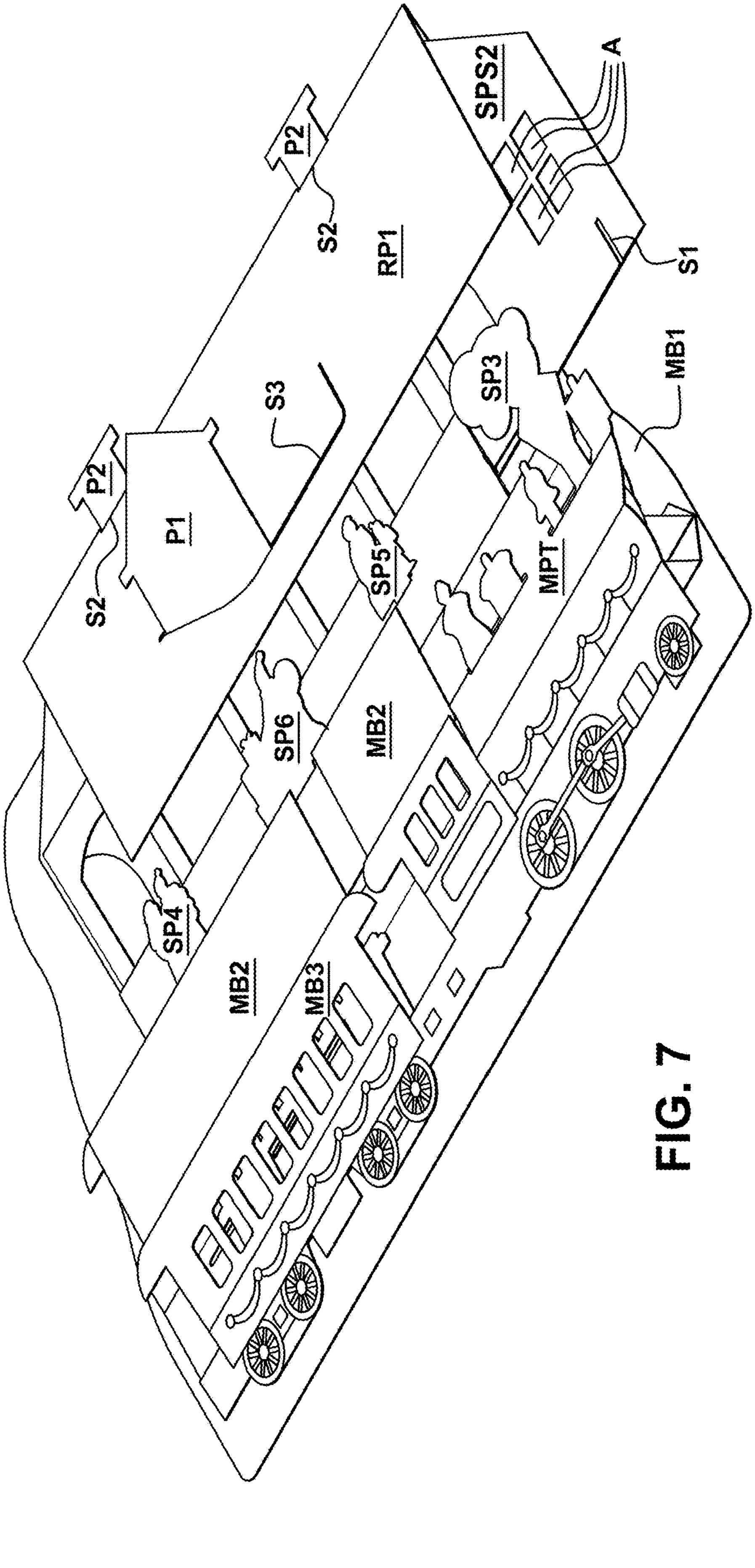
FIG. 7 is a perspective view of the pop-up scene with integrated lock of FIG. 1, in a substantially closed or folded position.
Figure 9:
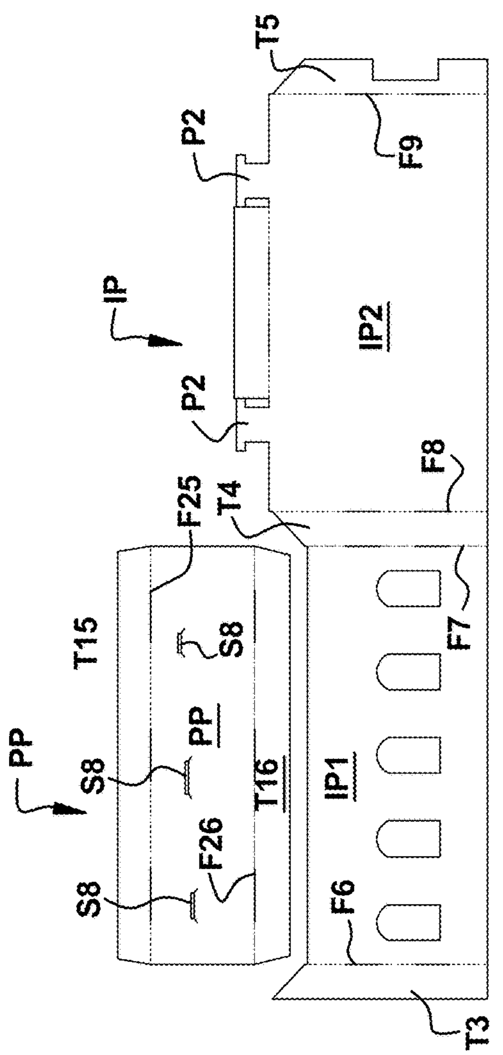
FIG. 9 is a top down view of a first inner pop-up and a platform panel.
Figure 8:
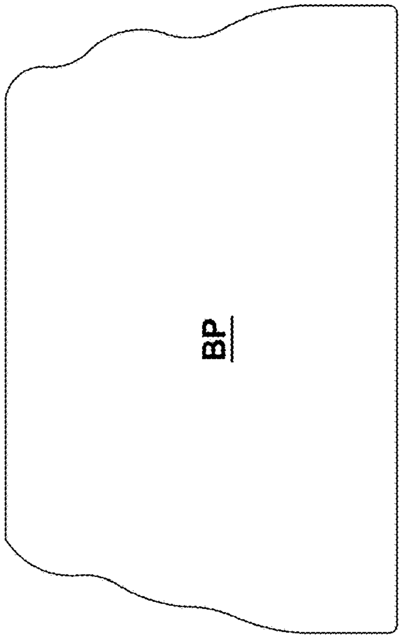
FIG. 8 is a top-down view of a base panel.
Figure 10:
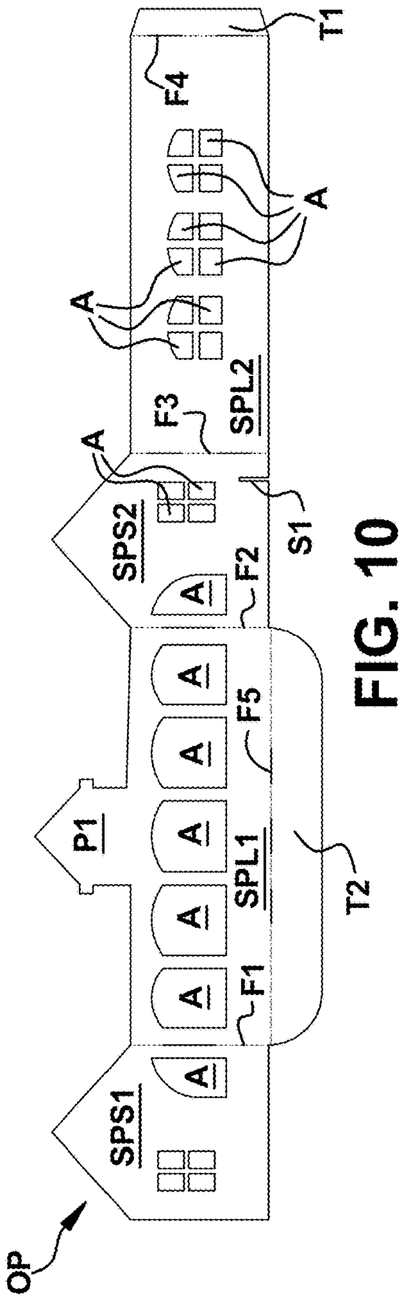
FIG. 10 is a front view of a first outer pop-up panel.
Figure 11:
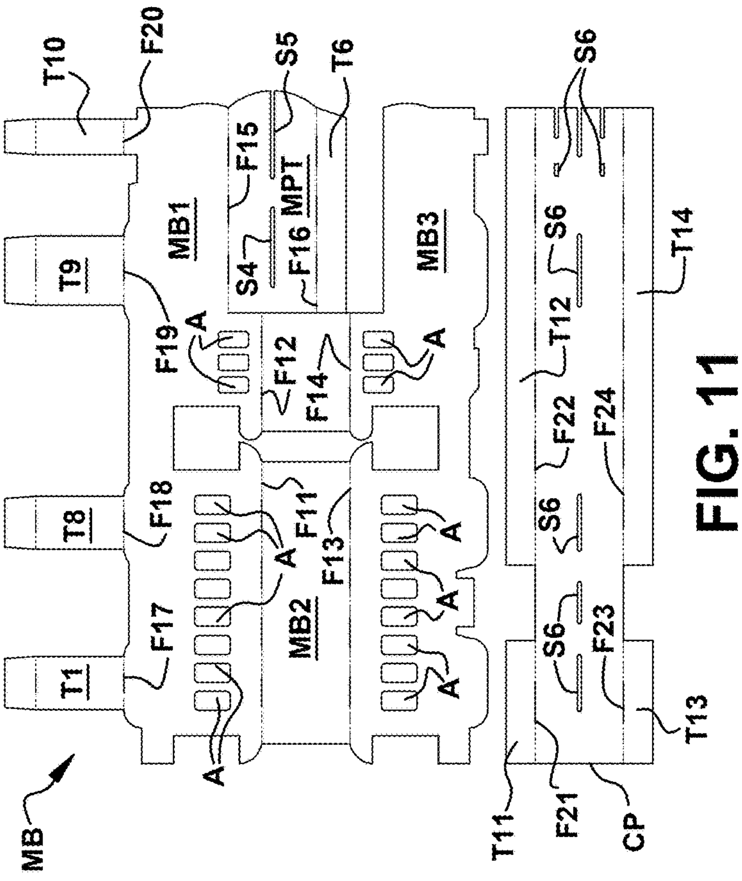
FIG. 11 is a top down view of a second pop-up panel.
Figure 12:
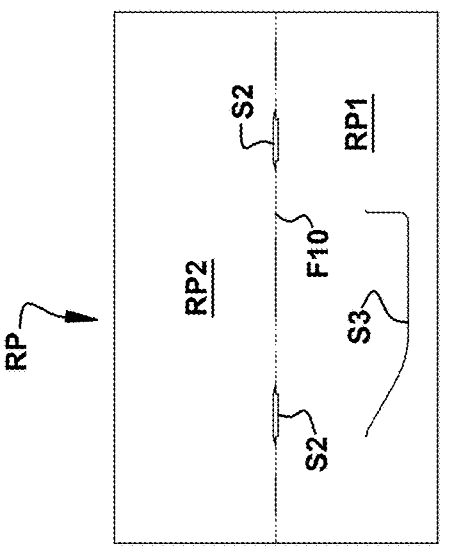
FIG. 12 is a top down view of a roof panel.
Figure 13:
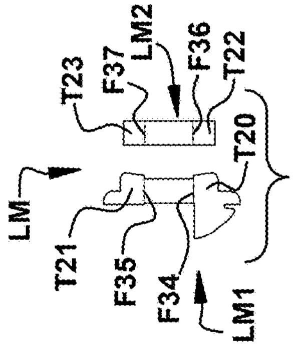
FIG. 13 is a front view of a locking mechanism.
Figure 14:
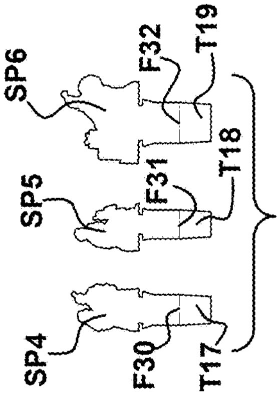
FIGS. 14-17 are front views of various secondary panels.
Figure 15:
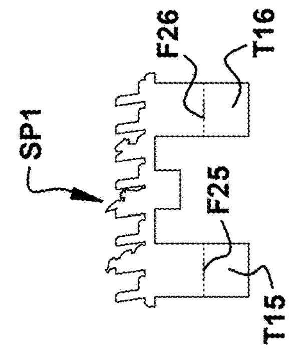
Figure 16:
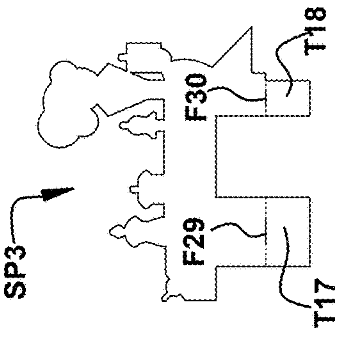
Figure 17:
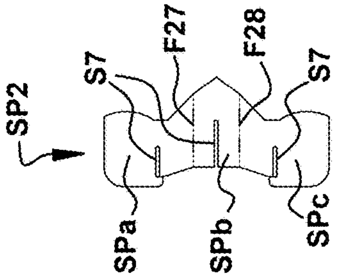

The present disclosure and related inventions include a foldable paper décor pop-up item (hereinafter referred to as "foldable paper décor item") 100 that is able to move between a first or flat position, for storage or mailing, and a second or fully unfolded, three-dimensional (3D) position, for display. The foldable paper décor item 100 includes a base panel BP, one or more pop-up structures POP, and an integrated lock mechanism (hereinafter referred to interchangeably as the "lock", "lock mechanism", or "locking mechanism") LM. The lock mechanism LM can move between a first position, wherein it is folded flat, and a second position, where it is in an unfolded, upright position. When the lock mechanism LM is in the second position, it retains the foldable paper décor item 100 in the second or fully unfolded position. The lock mechanism LM also serves as a part of the scene or display presented by the foldable paper décor item 100. The lock mechanism LM can continuously be moved between the first and second positions. The foldable paper décor item 100 is reusable and can be used from season-to-season. It takes up minimal storage space and it also does not have any loose or unattached parts that can inadvertently be lost or destroyed. It can also be easily gifted by placing it into the first, folded flat position, inserting it into an envelope and giving or mailing to a recipient. The foldable, unitary, and reusable nature of the foldable paper décor item 100 makes it a novel décor or gift item.

The foldable paper décor item 100 described herein and shown in the drawings is a foldable paper train station. However, this particular embodiment is being used as an exemplary embodiment to describe and depict the essential portions of the invention, and nothing written herein or shown in the drawings is intended to limit the invention in any way. The example embodiment may contain more features than other embodiments or fewer features than other embodiments, however all embodiments will share a set of fundamental features. Also, while the term "paper" has been described herein with respect to the invention, it should be understood that "paper", as used herein, is intended to mean any type of paper, paperboard, and cardboard (preferably recyclable material). In alternate embodiments, other materials (that are sufficiently strong yet flexible) have been anticipated and are considered to be within the scope of this invention.

As noted above, the exemplary embodiment, as described herein and shown in the drawings, is a foldable pop-up train station. As noted above, the foldable paper décor item 100 may contain one or more pop-up items POP. The one or more pop-up items POP include various die-cut panels that interconnect to form a particular shape that is designed to be easily and repeatedly folded between a flat, folded position and an upright, unfolded position. Each die-cut panel may take on a variety of different shapes and may be contiguous with, interlaced with, or attached to other die cut panels via various fold lines, adhesive or other attachment mechanisms. The lock mechanism LM, which can retain the foldable paper décor item 100 in an upright, unfolded position is also part of one or more of the pop-up items POP, making the foldable paper décor item 100 a single, unitary decorative or gift item. There are no loose or unattached parts that can be lost or destroyed. The one or more pop-up items POP can be made in a variety of shapes, sizes, and themes, such as, for example, a floral arrangement, Santa's sleigh, a house, or may set a particular scene, along with additional pop-up items POP, such as, for example, the North Pole, a Halloween scene, etc. The foldable paper décor item 100 may also be part of a larger decorative arrangement, such as, for example, a Christmas Village, containing two or more foldable paper décor items 100.

The base panel BP, in a preferred embodiment is a substantially planar or flat panel upon which a pop-up is attached. The base panel BP has a top surface and a bottom surface opposite the top surface. The base panel BP allows the foldable paper décor item 100 to be displayed on a substantially flat display surface, such as, for example, a tabletop, or a shelf. The base panel BP can be of any shape or size but will be sufficiently large enough to contain one or more pop-up items POP thereon. The base panel BP may have straight, linear edges or curvy, non-linear edges, or a combination of both. The one or more pop-up items POP are attached directly to the base panel BP or may be attached to an intermediate panel that is then attached to the base panel BP.

The one or more pop-up items POP, as noted above, contain various die cut panels of different shapes and sizes that are interconnected to form a structure capable of being moved between a substantially flat or folded position and an upright, unfolded position. In one embodiment, the foldable paper décor item 100, includes two pop-up items, a first pop-up POP1 and second pop-up POP2. The first pop-up POP1 is a four-sided structure having a pitched rooftop, in the shape of a train station. The second pop-up POP2 is a three-sided, elongate structure in the form of a train. The first and second pop-up structures POP1, POP2 are each separately attached to the base panel BP and are attached to one another via a planar platform panel PP. In other embodiments, there may be more than two pop-up items, or the pop-up items may not be connected to one another. Additional embodiments may include secondary panels or other decorative items. The pop-up items can take any shape or make up any type of scenic display.

The first pop-up POP1 includes both an outer pop-up structure OP and an inner pop-up structure IP. The outer pop-up structure OP includes a first short side panel SPS1 attached to a first long side panel SPL1 along fold file F1. The first long side panel SPL1 is attached to a second short side panel SPS2 along fold line F2 and the second short side panel SPS2 is attached to a second long side panel SPL2 along fold line F3. The second long side panel is attached to a tab panel T1 along fold line F4. The first long side panel SPL1 is attached to an elongate tab T2 along a lower edge thereof along fold line F5. The second short side panel SPS2 contains a narrow slot or slit S1 contained thereon which extends from a lower edge thereof upward into the second short side panel SPS2. The first long side panel SPL1 contains a projection P1 which extends upward from an upper edge UE thereof. The side panels of the first pop-up POP1 are folded along the fold lines to create a four-sided rectangular structure (or the outer pop-up structure OP) where the two long sides SPL1, SPL2 are parallel to and spaced apart from each other and perpendicular to the two short sides SPS1, SPS2, which are parallel to and spaced apart from each other. Each of the four side panels SPL1, SPL2, SPS1, SPS2 may contain various openings or apertures thereon A. An inner pop-up structure IP is attached to and contained within the outer pop-up structure OP. The inner pop-up structure IP includes a tab T3 attached to a first inner panel IP1 along fold line F6. The first inner panel IP1 is attached to a tab T4 along fold line F7 and the tab T4 is attached to a second inner panel IP2 along fold line F8. The second inner panel IP2 is also attached to a tab T5 along fold line F9. The second inner panel IP2 additionally contains one or more projections or protrusions P2 extending in an upward direction from the upper edge UE thereof. The inner pop-up structure IP is attached to and contained within the outer pop-up structure OP by folding the panels and tabs along fold lines F6-F9 and attaching tab T3 (of the IP) to the first short side panel SPS1 (of the OP) and attaching the tab T4 (of the IP) to the second short side panel SPS2 (of the OP). The first pop-up POP1 also includes a rooftop panel RP that sits atop the outer pop-up structure OP and is connected to the inner pop-up structure IP. The rooftop panel RP is bisected by a fold line F10, creating two equally sized rooftop sub-panels RP1, RP2. The fold line F10 contains one or more slits or openings S2 thereon, and the first roof sub-panel RP1 contains an opening, slot, or aperture S3 thereon. The one or more projections P2 that extend above the top edge of the second inner panel IP2 are inserted through the one or more slit or openings S2 along fold line F10 that bisects the roof panel RP and the tab T5 connected to the second inner panel IP2 (along fold line F9) is attached to the underside of the first rooftop sub-panel RP1 proximate the fold line F10. The projection P1 that extends upward from the upper edge UE of the first long side panel SPL1 (of the OP) is inserted into the slot or aperture S3 on the first rooftop sub-panel RP1 (when the foldable paper décor item 100 is in the second or unfolded, upright position).

The second pop-up POP2 is configured to form a paper structure in the form of a train. It includes a main body MB, a center panel CP, and a variety of secondary shaped panels SP. The main body MB of the second pop-up POP2 includes a first panel MB1, a second panel MB2 and a third panel MB3. The first panel MB1 of the main body MB is attached to the second panel MB2 along fold lines F11 and F12 and the second panel MB2 is attached to the third panel MB3 along fold lines F13 and F14. The first panel MB1 is attached to a top panel MBT along fold line F15 and the top panel MBT is attached to a tab T6 along fold line F16. The first panel MB1 is also attached to tab T7 along fold line F17, tab T8 along fold line F18, tab T9 along fold line F19, and T10 along fold line F20. The top panel MBT contains two separate slots S4, S5 thereon. The first MB1, second MB2, and third MB3 panels may contain one or more openings or apertures A thereon. The center panel CP is attached on one side to tab T11 along fold line F21 and to tab T12 along fold line F22, and along the opposite side to tab T13 along fold line F23 and tab T14 along fold line F24. The center panel CP also contains several slots S6 contained thereon. A first secondary panel SP1 is attached to tab T15 along fold line F25 and tab T16 along fold line F26. A second secondary panel SP2 contains a first fold line F27 and F28 which divide the second secondary panel SP2 into three sub-panels SP2*a*, SP2*b*, and SP2*c*. Each of the three sub-panels contains a slot S7 thereon. A third secondary panel SP3 is attached to a tab T17 along fold line F29, and to tab T18 along fold line F30. A fourth secondary panel SP4 is attached to tab T17 along fold line F30. A fifth secondary panel SP5 is attached to tab T18 along fold line F31, and a sixth secondary panel SP6 is attached to tab T19 along fold line F32. A platform panel PP is attached to tab T15 along fold line F25 and to tab T16 along fold line F26. The platform panel PP has at least one slot S8 contained thereon.

In constructing the train shape, the main body is folded along fold lines F11-F14 to form an inverted U-shaped structure. The tabs T7, T8, T9, T10 are folded along fold lines F17, F18, F19, F20 respectively and a portion of each tab T7-T10 is attached to the base panel BP and a portion of each tab T7-T10 are attached to an inside surface of the third panel MB3 of the main body. Tabs T15 and T16 on the first secondary shaped panel SP1 are folded along fold lines F25 and F26 respectively and attached to tabs T7 and T8 (of the main body MB) respectively. The second secondary shaped panel SP2 is folded upward along fold lines F27 and F28 and the third secondary shaped panel SP3 is inserted into the slot contained on the second secondary shaped sub-panel SP2*b*. The center panel is placed atop the first, second, and third secondary panels SP1, SP2, SP3 and portions of the first and third subpanels SP1, SP3 are inserted through the some of the slots S6 contained on the center panel CP. The first SP2*a* and third SP2*c* sub-panels of the second secondary shaped sub-panel SP2*b* are inserted into the slots S6 contained at the end of the center panel CP. A portion of the third secondary sub-panel SP3 are inserted through the slots S4, S5 on the top panel MBT of the main body MB. Tabs T11-T14 on the center panel CP are attached to an inside surface of the first MB1 or third MB3 panel of the main body MB. Fourth SP4, fifth SP5, and sixth SP6 secondary sub-panels are folded along fold lines F31-F33, respectively, and tabs T17-T19 are attached to the base panel BP. The platform panel PP is folded downward along fold lines F25 and F26. Tab T15 is attached to an outside surface of the first panel MB1 of the main body and tab T16 is attached to an outside surface of the first long side panel SPL1, thereby connecting the first pop-up POP1 and the second pop-up POP2. A portion of the fourth SP4, fifth SP5, and sixth SP6 secondary sub panels are inserted through the slots S8 on the platform panel PP.

The locking mechanism LM includes a first locking panel LM1 and a second locking panel LM2. The first locking panel LM1 is attached to tab T20 along fold line F34 and to tab T21 along fold line F35. The second locking panel LM2 is attached to tab T22 along fold line F36 and to tab T23 along fold line F37. The first locking panel is folded downward along fold lines 34 and 35 and tab T20 is attached to T22 and tab T21 is attached to T23. The second locking panel LM2 is folded upward along fold lines F36 and F37 and attached to the base panel BP. The locking mechanism LM is moveable between a firsts position wherein it is folded flat against the base panel and a second position wherein it is unfolded and upright. The locking mechanism LM takes the form of a small bench, which becomes part of train station scene of the foldable paper décor item 100. When the foldable paper décor item 100 is in its second or unfolded, upright position, the bench is part of the scenery and does not look like it is locking the whole item in place. Because the lock mechanism becomes part of the scenery of the foldable pop-up décor item, it does not interfere with the aesthetic of the scene presented by the foldable pop-up décor item. Also, the lock mechanism LM is substantially smaller in size as compared with the first and second pop-ups POP1, POP2, it perfectly blends into the scenic display and does not distract from the overall visual appeal of the foldable décor item 100.

In operation, the foldable paper décor item 100 is in a first or substantially flat, folded position. In this first position, the foldable paper décor item 100 can be inserted into an envelope for mailing or storage. The locking mechanism LM, the first pop-up POP1, the second pop-up POP2, and the platform panel PP are all in a substantially flat, folded, semi-stacked arrangement. To move the foldable paper décor item 100 from the first position to a second position, wherein it is unfolded and upright, a user must lift the first pop-up POP1 into an upward or standing position. The user may then lift the locking mechanism LM into the second position, wherein it is also unfolded and upright. The user can then fully expand the first pop-up POP1 by placing one hand on the first short side panel SPS1 and another hand on the second short side panel SPS2 of the main body and push inward. The slot contained on the second short side panel SPS2 can then be inserted over tab T22 of the locking mechanism LM thereby retaining the foldable paper décor item 100 in the second position. The protrusion contained on the first long side panel SPL1 of the first pop-up item POP1, may also be inserted into the slot S3 on the first rooftop panel RP1 to secure the rooftop panel RP to the outer pop-up structure OP of the first pop-up POP1.

The foldable paper décor item can be moved back into the first position by removing the second short side panel SPS2 from tab T22 of the locking mechanism, pushing the locking mechanism LM into the first or flat position, and pushing the second long side panel SPL2 towards the first long side panel SPL1.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

The invention claimed is:

1. A foldable paper décor item with integrated lock comprising:
- a base panel;
- a pop-up structure attached to the base panel; and
- a miniature pop-up structure attached to the base panel; and
- wherein moving the foldable paper décor item from a closed position to an open position causes the pop-up structure and miniature pop-up structure to rise out of the plane of the base and assume a three-dimensional configuration, with the miniature pop-up structure becoming a decorative element of the pop-up structure and retaining the entire foldable paper décor item in the open position.

2. The foldable paper décor item of claim 1 wherein a second pop-up structure is attached to the base.

3. The foldable paper décor item of claim 2, wherein the two pop-up structures and miniature pop-up structure create a scenic display.

4. The foldable paper décor item of claim 1 wherein one or more decorative paper items are attached to the base.

5. The foldable paper décor item of claim 2, wherein the base panel, the first and second pop-up structures, and the miniature pop-up structure are made of a recyclable material.

6. A foldable paper décor item comprising:
- a base panel;
- a first pop-up structure attached directly to the base panel;
- a second pop-up structure attached directly to the base panel and to the first pop-up structure;
- a third pop-up structure attached directly to the base panel;
- wherein the first, second, and third pop-up structures comprise a plurality of
- panels and are moveable between a first, substantially flat position and a second, upright position; and
- wherein the third pop-up structure is also a lock mechanism that engages with the first pop-up structure to retain the foldable paper décor item in the second position.

7. The foldable paper décor item of claim 6, wherein the first, second, and third pop-up structures create a scene.

8. A foldable paper décor item comprising:

a singular, planar base panel;

a pop-up structure and a miniature pop-up structure, which are each attached to the base panel and which are each comprised of a plurality of panels;

wherein opening the foldable paper décor item causes the pop-up structure and miniature pop-up structure to rise out of the plane of the base panel and assume a three-dimensional configuration; and wherein when the foldable paper décor item is in the open position, the miniature pop-up structure interlocks with the pop-up structure to maintain the entire foldable paper décor item in the open position.

9. The foldable paper décor item of claim 8, wherein base panel, pop-up structure and miniature pop-up structure are made of a recyclable material.

* * * * *